(12) United States Patent
Martin et al.

(10) Patent No.: US 7,997,505 B2
(45) Date of Patent: Aug. 16, 2011

(54) BYPASS VALVE FOR A COOLER CONNECTED DOWNSTREAM OF A HYDRAULIC UNIT

(75) Inventors: Hans-Joachim Martin, Kressbronn (DE); Anton Fritzer, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 421 days.

(21) Appl. No.: 12/377,270

(22) PCT Filed: Jul. 30, 2007

(86) PCT No.: PCT/EP2007/057807
§ 371 (c)(1),
(2), (4) Date: Feb. 12, 2009

(87) PCT Pub. No.: WO2008/022874
PCT Pub. Date: Feb. 28, 2008

(65) Prior Publication Data
US 2010/0213401 A1 Aug. 26, 2010

(30) Foreign Application Priority Data

Aug. 23, 2006 (DE) .......................... 10 2006 039 554

(51) Int. Cl.
*F01P 7/00* (2006.01)
*G05D 23/02* (2006.01)
(52) U.S. Cl. .................................. 236/34.5; 236/101 D
(58) Field of Classification Search .................. 236/34.5, 236/87, 93 R, 101 R, 101 D
See application file for complete search history.

(56) References Cited

U.S. PATENT DOCUMENTS

| 3,913,831 | A | * | 10/1975 | Talak | 236/34.5 |
|---|---|---|---|---|---|
| 4,190,198 | A | * | 2/1980 | Casuga et al. | 236/34.5 |
| 5,261,597 | A | | 11/1993 | Perlman et al. | |
| 5,803,354 | A | * | 9/1998 | Benedict | 236/12.2 |
| 6,253,837 | B1 | | 7/2001 | Seiler et al. | |
| 7,819,332 | B2 | * | 10/2010 | Martin et al. | 236/34.5 |
| 2004/0232249 | A1 | * | 11/2004 | Brown et al. | 236/34.5 |

FOREIGN PATENT DOCUMENTS

| DE | 29705018 | 5/1997 |
|---|---|---|
| DE | 20114702 | 9/2001 |
| EP | 1302711 | 4/2003 |
| EP | 1544009 | 6/2005 |
| FR | 2713361 | 12/1993 |
| JP | 2004092170 | 3/2004 |
| JP | 2004204918 | 7/2004 |
| JP | 2006138235 | 6/2006 |
| WO | 2007036354 | 4/2007 |

* cited by examiner

*Primary Examiner* — Marc Norman
(74) *Attorney, Agent, or Firm* — Davis & Bujold, P.L.L.C.

(57) ABSTRACT

A bypass valve for a cooler connected downstream from a hydraulic aggregate. The bypass valve includes a housing with ports for connection to the hydraulic aggregate and the cooler. A closure element is located in the housing for closing and opening a bypass. A spring pushes the closure element into a closing position, and thermo-sensitive means causes the closure element to open if the temperature of the hydraulic fluid is below a threshold temperature. The thermo-sensitive means are formed by the valve spring, which is made of a memory-metal alloy with a transition point close to the threshold temperature such that below the threshold temperature it no longer exerts a force and allows the closure element to open.

5 Claims, 2 Drawing Sheets

BYPASS VALVE FOR A COOLER CONNECTED DOWNSTREAM OF A HYDRAULIC UNIT

National Stage of PCT/EP2007/057807 filed on Jul. 30, 2007 which claims priority from German Application 10 2006 039 554.9 filed Aug. 23, 2006.

FIELD OF INVENTION

The invention concerns a bypass valve for a cooler connected downstream from a hydraulic aggregate.

A typical field of application for such bypass valves is for example that of oil coolers connected downstream from an automatic transmission or a hydraulic torque converter of a motor vehicle. The cooler is designed so that the temperature of the hydraulic fluid does not exceed a particular maximum value corresponding to the upper limit of a suitable temperature range. On the other hand if, for example at the beginning of operation or when the external temperatures are extremely low, the temperature of the hydraulic fluid is below the suitable operating range, i.e. perhaps lower than about 80° C., then the hydraulic fluid should be diverted past the oil cooler so that the desired operating temperature is reached (again) sooner.

BACKGROUND OF THE INVENTION

From U.S. Pat. No. 6,253,837 B1 a bypass valve of the type described is already known, in which the valve spring that pushes the closure element to its closing position is supported on a thermo-sensitive control drive, which during normal operation, i.e. when the hydraulic fluid is within its normal temperature range, acts upon the valve spring so that the latter presses the closure element against an associated valve seat, thereby closing the bypass. In this operating mode the hydraulic fluid coming from the hydraulic aggregate passes through the cooler and back again to the hydraulic aggregate. If the temperature of the hydraulic fluid falls below the minimum desired operating temperature, the thermo-sensitive control drive relaxes the force on the valve spring sufficiently for the closure element, under the action of the restoring spring, to be pushed to an open position and the bypass is opened, so that at least some of the hydraulic fluid coming from the hydraulic aggregate bypasses the cooler. In one embodiment the inlet line to the cooler is at the same time closed so that the cooler is cut off. In such a case all the hydraulic fluid bypasses the cooler and flows back, uncooled, into the hydraulic aggregate. The thermo-sensitive control drive is of the piston-cylinder type, the cylinder being filled with a thermo-sensitive material, for example wax, which expands or contracts more or less as a function of the temperature. The closure element is made as a ring arranged to move along a shaft of the control drive, so that if pressure peaks occur in the hydraulic fluid it can be lifted clear of the valve seat even though the thermo-sensitive control drive is in the bypass-closing position.

The design and structure of the known bypass valve are relative elaborate and it is therefore comparatively expensive to manufacture. Moreover, owing to the use of a separate control drive and owing to the displaceable mounting of the closure element, it is prone to malfunction.

SUMMARY OF THE INVENTION

Against this background the purpose of the present invention is to provide a bypass valve, which is of simpler design and structure compared with the known solution and is therefore less liable to malfunction. At the same time, however, it should be able to perform the same functions.

The invention is based on the recognition that the structure of a bypass valve would be considerably simplified if it were possible to combine the functions of the valve spring and the thermo-sensitive control drive.

Accordingly, the starting point for the invention is a bypass valve for a cooler connected downstream from a hydraulic aggregate, comprising a valve housing with connection ports for connection to the hydraulic aggregate on one side and to the cooler on the other side, a closure element inside the housing which closes or opens a bypass, a valve spring that pushes the closure element to its closing position, and thermo-sensitive means which bring about the opening of the closure element if the temperature of the hydraulic fluid is lower than a specified threshold temperature.

To achieve the declared objective it is provided that the thermo-sensitive means are formed by the valve spring itself, which for this purpose is made from a memory-metal alloy (a shape-remembering metal alloy) with a transition point close to the threshold temperature, such that below this threshold temperature it exerts no force and allows the closure element to open under the action of the hydraulic fluid pressure.

The memory-metal alloy is designed such that in the normal operating range of the hydraulic aggregate mentioned earlier, in which the temperature of the hydraulic fluid is above about 80° C., it functions as a valve spring, pressing the closure element against its associated valve seat and thereby closing the bypass. If the operating temperature of the hydraulic aggregate and hence the temperature of the hydraulic fluid fall below about 80° C., as a result of a sudden structural change of the memory-metal alloy, the valve spring loses its springiness that determines the shape of the valve spring in the operating mode. The valve spring then exerts essentially no force, so it no longer pushes the closure element in the closing direction and allows it, for example under the action of the hydraulic fluid pressure, to lift off the valve seat and open the bypass. In the general case the hydraulic fluid coming from the hydraulic aggregate then branches into a stream flowing back directly through the bypass to the hydraulic aggregate and a stream flowing back to the hydraulic aggregate through the cooler, so that the temperature of the hydraulic fluid and thus of the hydraulic aggregate increases.

A preferred design feature of the invention provides that the closure element is connected to a control piston guided within a cylindrical chamber of the valve housing, which when the closure element is closed, connects a first connection port, itself connected to a cooler outlet line, to a second connection port itself connected to a hydraulic aggregate inlet line, and when the closure element is open, connects the second connection port to a third connection port, itself connected to a bypass line that branches off a cooler inlet line, and closes the said first connection port.

This design ensures that when the bypass is open, while at the same time the flow to the cooler is completely cut off, such that all the hydraulic fluid flow coming from the hydraulic aggregate is passed back into the hydraulic aggregate without being cooled. In this way the desired operating temperature of the hydraulic aggregate is reached particularly quickly.

According to another design feature of the invention the valve spring is designed such that at a hydraulic fluid temperature above the threshold temperature, i.e. when the bypass is closed, although the closure element remains closed against the normal operating pressure of the hydraulic fluid it is allowed to open in the event of a pressure peak above that pressure. This enables the cooler to be protected against pressure surges in the hydraulic fluid circuit without additional design measures.

A design feature of the bypass valve provides that the control piston is essentially cylindrical and has an outer diameter smaller than the inside diameter of the cylindrical chamber holding the control piston. The control piston is guided in the cylindrical chamber, at one end area facing toward the closure element by a guiding flange in contact with the cylinder wall and at the end area facing away from the closure element in a receiving opening of a plug or suchlike that closes the cylindrical chamber, in such manner that the valve spring surrounds the control piston radially on the outside and is supported on one side against the guiding flange and on the other side against the plug.

In another design of the bypass valve the control piston is made essentially as a hollow cylinder, the valve spring being arranged inside the hollow-cylindrical control piston and being supported on one side against an internal step of the hollow-cylindrical control piston and on the other side against a plug or suchlike that closes the cylindrical chamber.

To assist the raising of the closure element for the bypass mode, according to a further feature of the invention an additional spring can be provided on the side of the closure element facing away from the valve spring, which opposes the valve spring and is supported against the valve housing.

BRIEF DESCRIPTION OF THE DRAWINGS

The invention can be explained in more detail with reference to example embodiments. For this purpose the description includes drawings which show.

DETAILED DESCRIPTION OF THE INVENTION

Figure 1:
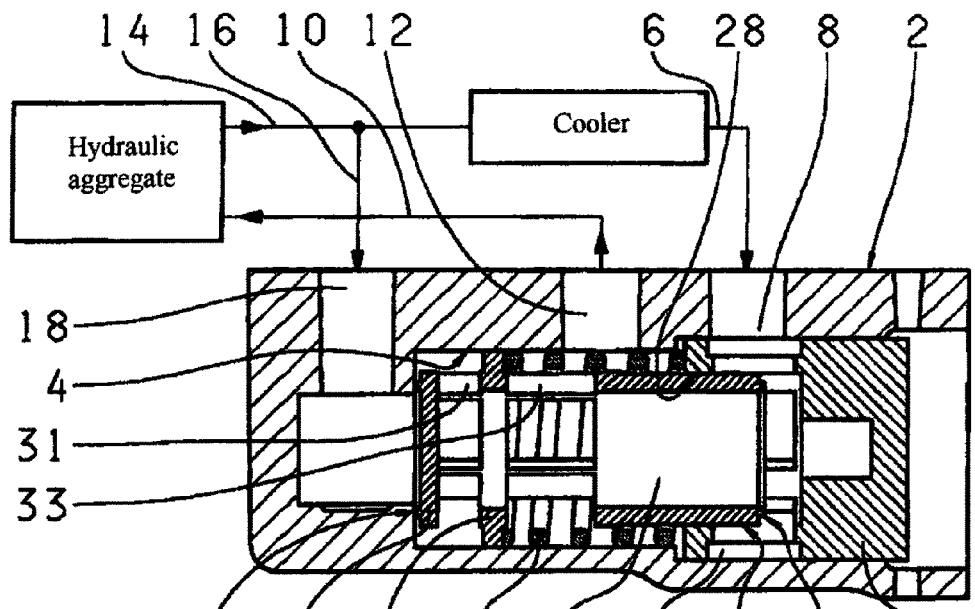
FIG. 1 as a schematic longitudinal section of a bypass valve in a position such that the bypass is closed
Figure 2:
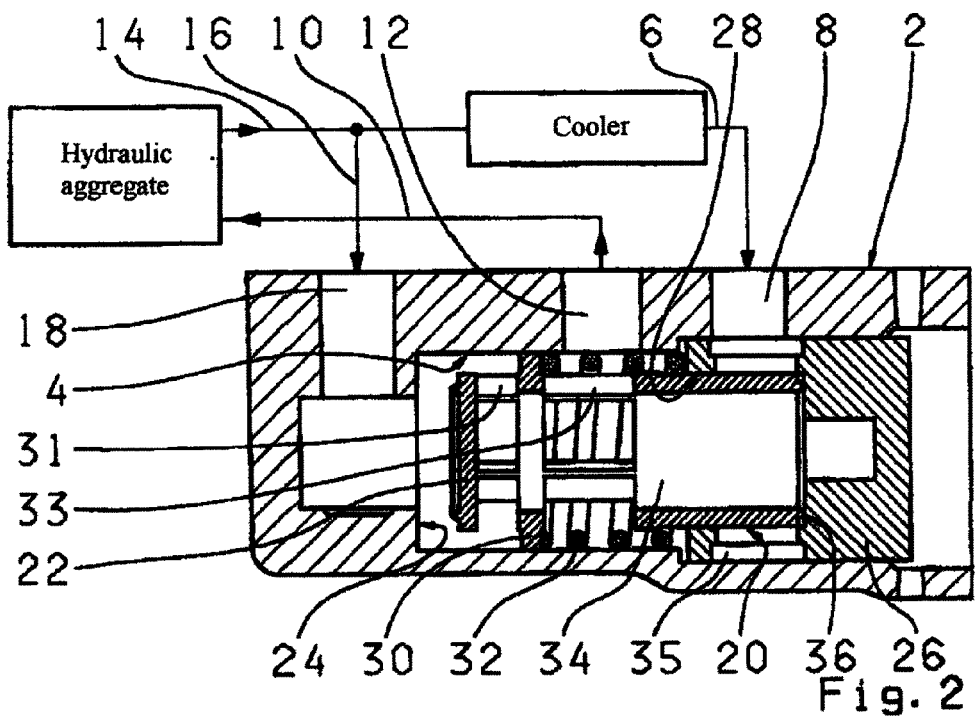
FIG. 2 is a representation of FIG. 1, but with the bypass open.

The bypass valve shown in FIGS. 1 and 2 comprises a valve housing 2 in which there is formed a cylindrical chamber 4. The cylindrical chamber 4 is closed at one end, the end on the left in FIGS. 1 and 2, and open at the other end.

The cylindrical chamber 4, has a first connection port 8, which connects a cooler outlet line 6, a second connection port 12 connected to a hydraulic aggregate inlet line 10 and a third connection port 18 connected to a bypass line 16 that branches off from a cooler inlet line 14.

A control piston 20 is arranged to move within the cylindrical chamber 4. At the end of the control piston 20 facing toward the third connection port 18 is arranged a valve-disk-type closure element 22 which can open or close a bypass. For this purpose the cylindrical chamber 4 has in its area facing toward the third connection port 18 an inward-projecting step, which serves as the valve seat 24 for the closure element 22.

The open end of the cylindrical chamber 4 on the right in FIGS. 1 and 2 is closed by a sealing plug 26, which has at its end facing toward the control piston 20 a receiving opening 28 to receive and guide the control piston 20. In the area of the receiving opening 28 the cylindrical wall of the plug 26 is perforated so that the receiving opening 28 is in flow communication with the first connection port 8.

In the example shown in FIGS. 1 and 2 the outer diameter of the control piston 20 is substantially smaller than the inside diameter of the cylindrical chamber 4 holding the control piston 20. In its end area facing toward the cooling element 22 there is formed a guiding flange 30 in contact with the cylinder wall 4, by which the control piston 20 is guided in the cylindrical chamber 4. As has already been mentioned, the end of the control piston 20 facing toward the connection port 8 is guided within the receiving opening 28 of the plug 26.

The control piston 20 is made as a hollow cylinder, such that in its end area facing toward the connection port 18 the cylinder wall has in the axial direction in front of and behind the guiding flange 30 radial perforations 31 and 33 respectively, so that the inside space 34 of the control piston 20 is in fluid flow communication with the outside. In the end area of the control piston 20 guided within the receiving opening 28 the cylinder wall 4 is closed, whereas the associated, right-hand end 36 of the hollow-cylindrical control piston 20 is open. Furthermore, the receiving space of the plug 26 is provided with at least one radial perforation 35 which, for its part, is in flow communication with the first connection port 8.

The control piston 20 is acted upon by a valve spring 32 in the form of a spiral spring, which rests on one side against the left-hand end face of the plug 26 and on the other side against the guiding flange 30 of the control piston 20, in such manner that the closure element 22 is against the valve seat 24. The valve spring 32 consists of a memory-metal alloy with a transition point close to the threshold temperature of the hydraulic fluid. The result of this is that if the temperature of the hydraulic fluid is lower than the threshold temperature the valve spring 32 exerts no force and allows the closure element 22 to open, for example under the action of the hydraulic fluid passing to it through the bypass line 16.

The function of the bypass valve is as follows: When the hydraulic fluid is at normal operating temperature, for example above 80° C., the closure element 22 is pressed by the valve spring 32 against the valve seat 24 so that any inflow of hydraulic fluid through the third connection port 18 is blocked. At the same time the end 36 of the control piston 20 on the right in FIGS. 1 and 2 is moved away from the plug 26, so that a connection is formed from the cooler outlet line 6 to the hydraulic aggregate inlet line 10 via the first connection port 8, the perforation 35, the open end 36 of the control piston 20, the perforation 33 in the control piston wall and the second control port 12. In this position of the bypass valve, which corresponds to a cooling mode, all the hydraulic fluid passes through the cooler and is cooled.

If the hydraulic fluid temperature falls below about 80° C., owing to its properties the valve spring 32 no longer exerts a force, so that under the action of the hydraulic fluid coming in through the bypass line 16 and the connection port 18 the closure element 22 is raised clear of the valve seat 24 and the control piston 20 moves to the right, until its end 36 is against the plug 26 and is thereby closed (FIG. 2). This blocks any inflow through the first connection port 8, while a connection is formed between the bypass line 16 and the hydraulic aggregate inlet line 10 via the third connection port 18, the perforation 31 in the wall of the control piston 20, the inside space 34 of the control piston 20, its perforation 33 and the second inlet port 12. In this bypass mode all the hydraulic fluid bypasses the cooler, so it is not cooled.

If an operating mode is desired in which part of the hydraulic fluid flows through the cooler, this can be achieved by maintaining a connection between the first connection port 8 and the inside space 34, for example by means of perforations in the control piston wall, although this is not specifically illustrated.

Figure 3:
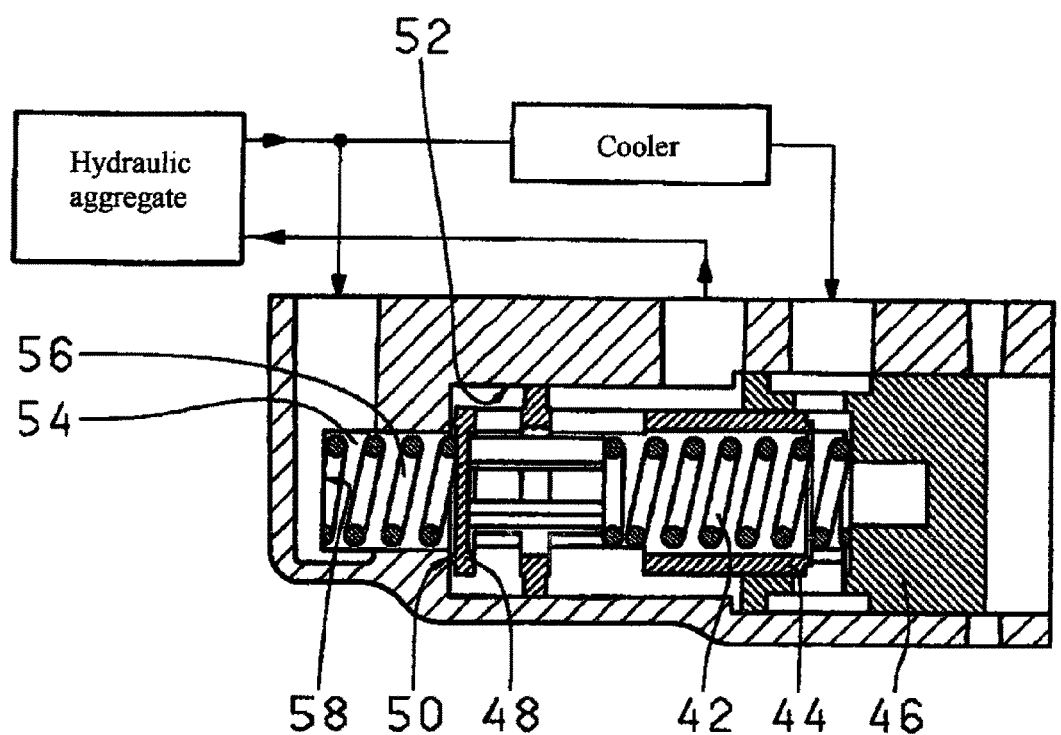
FIG. 3 is a view similar to those of FIGS. 1 and 2, of a bypass valve of different design

FIG. 3 shows another example embodiment of a bypass valve which, although it has the same function as the bypass valve of FIGS. 1 and 2, is structurally slightly different from the latter. In contrast to the example embodiment of FIGS. 1 and 2, the valve spring 42 made of a memory-metal alloy is arranged within the inside space of the control piston 44 and rests at one end against the plug 46 and at the other end against, for example, an inward-projecting step in the inside space of the control piston 44. The functions in the cooling mode and in the bypass mode are the same as with the example embodiment according to FIGS. 1 and 2, so there is no need to repeat the explanation here.

To assist the raising of the closure element 48 from its associated valve seat 50 for the bypass mode, in FIG. 3 on the left there is an end area 54 of smaller diameter compared with the rest of the cylindrical chamber 52, in which an additional spring 56 is arranged which rests at one end against the axial bottom 58 of the end area 54 and the other end against the closure element 48.

INDEXES

2 Valve housing
4 Cylindrical chamber
6 Cooler outlet line
8 Connection port
10 Hydraulic aggregate inlet line
12 Connection port
14 Cooler inlet line
16 Bypass line
18 Connection port
20 Control piston
22 Closure element
24 Valve seat
26 Plug
28 Receiving opening
30 Guiding flange
31 Perforation
32 Valve spring
33 Perforation
34 Inside space
35 Perforation
36 End of 20
42 Valve spring
44 Control piston
46 Plug
48 Closure element
50 Valve seat
52 Cylindrical chamber
54 End area
56 Additional spring
58 Bottom

The invention claimed is:

1. A bypass valve for a cooler connected downstream from a hydraulic aggregate, the bypass valve comprising a valve housing (2) with at least first and second connection ports (8, 12, 18) for respective connection to the hydraulic aggregate and to the cooler, a closure element (22) being arranged in the valve housing for closing and opening a bypass, a valve spring (32) biasing the closure element (22) into a closed position, and a thermo-sensitive means causing the closure element to open if a temperature of hydraulic fluid is below a threshold temperature, the thermo-sensitive means comprising a valve spring (32, 42) made from a memory-metal alloy having a transition point close to the threshold temperature such that, below the threshold temperature, the valve spring (32, 42) does not exert any force on the closure element (22) and allows the closure element (22) to open under action of hydraulic fluid pressure, a substantially cylindrical control piston (20) having an outer diameter smaller than an inside diameter of a cylindrical chamber (4), which holds the control piston (20), the control piston (20) being guided in an end area of the cylindrical chamber (4) facing the closure element (22) by a guiding flange (30) in contact with a cylinder wall, and the control piston (20) being guided in an end area of the cylindrical chamber (4) facing away from the closure element (22), and the control piston (20) being guided in a receiving opening (28) of a plug (26) that closes the cylindrical chamber (4), and the valve spring (32) surrounds the control piston (20) and is supported, on one side, against the guiding flange (30) and, on an opposite side, against the plug (26).

2. The bypass valve according to claim 1, wherein the first connection port (8) is connected to a cooler outlet line (6), the second connection port (12) is connected to a hydraulic aggregate inlet line (10), and a third connection port (18) is connected to a bypass line (16), which branches off from a cooler inlet line (14), the closure element (22) is connected to the control piston (20), which is guided in the cylindrical chamber (4) of the valve housing (2), when the closure element (22) is in the closed position, the control piston (20) connects the first connection port (8) to the second connection port (12), and when the closure element (22) is in the open position, the control piston (20) connects the second connection port (12) to the third connection port (18) and blocks the first connection port (8).

3. The bypass valve according to claim 1, wherein the valve spring (32, 42) retains the closure element (22) in the closed position when the hydraulic fluid temperature is above the threshold temperature and, if a spike in the hydraulic fluid pressure occurs, the valve spring (32, 42) enables the closure element (22) to open.

4. The bypass valve according to claim 1, wherein an additional spring (56), which acts in opposition to the valve spring (42), is arranged on a side of the valve spring (42) facing away from the closure element (48).

5. The bypass valve according to claim 1, wherein the threshold temperature of the memory-metal alloy of the valve spring (32, 42) is approximately 80° C.

* * * * *